United States Patent
Karimi-Cherkandi et al.

(10) Patent No.: US 10,803,880 B2
(45) Date of Patent: *Oct. 13, 2020

(54) METHOD, DEVICE, AND SYSTEM FOR AUDIO DATA PROCESSING

(71) Applicant: Unify GmbH & Co. KG, Munich (DE)

(72) Inventors: Bizhan Karimi-Cherkandi, Boca Raton, FL (US); Farrokh Mohammadzadeh Kouchri, Boca Raton, FL (US); Schah Walli Ali, Boca Raton, FL (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,237

(22) Filed: May 1, 2019

(65) Prior Publication Data

US 2019/0259406 A1 Aug. 22, 2019

Related U.S. Application Data

(63) Continuation of application No. 15/665,537, filed on Aug. 1, 2017, now Pat. No. 10,325,612, which is a
(Continued)

(51) Int. Cl.
*G10L 21/02* (2013.01)
*H04M 1/247* (2006.01)
*G10L 17/00* (2013.01)

(52) U.S. Cl.
CPC .............. *G10L 21/02* (2013.01); *G10L 17/00* (2013.01); *H04M 1/2475* (2013.01)

(58) Field of Classification Search
CPC ...................................................... G10L 21/00
See application file for complete search history.

(56) References Cited

U.S. PATENT DOCUMENTS 4,296,277 A 10/1981 Daneffel
4,538,295 A 8/1985 Noso et al.
(Continued)

FOREIGN PATENT DOCUMENTS

AU 2011200681 A1 10/2011
CN 1270735 A 10/2000
(Continued)

OTHER PUBLICATIONS

Breitfelder, Kim, and Don Messina. "IEEE 100: The authoritative dictionary of IEEE standards terms." Standards Information Network IEEE Press. (2000). (Year: 2000).*
(Continued)

*Primary Examiner* — Brian L Albertalli
(74) *Attorney, Agent, or Firm* — Finnegan, Henderson, Farabow, Garrett & Dunner LLP

(57) ABSTRACT

A method and apparatus that filters audio data received from a speaking person that includes a specific filter for that speaker. The audio characteristics of the speaker's voice may be collected and the specific filter may be formed to reduce noise while also enhancing voice quality. For instance, if a speaker's voice does not contain specific frequencies, then a filter may cancel the noise at such frequencies to ease noise cancellation and reduce processing sound spectrum for cleaning that is not needed. Additionally, the strength frequencies of a speaker's voice may be identified from the collected audio characteristics and those spectrums can be filtered with finer granularity to provide a speaker specific filter that enhances the voice quality of the speaker's voice data that is transmitted or output by a communication device. The audio data may also be output based upon a user's predefined hearing spectrum.

19 Claims, 4 Drawing Sheets

Related U.S. Application Data continuation of application No. 14/372,233, filed as application No. PCT/US2012/065995 on Nov. 20, 2012, now abandoned.

(56) References Cited

U.S. PATENT DOCUMENTS

| | | | |
|---|---|---|---|
| 5,724,433 | A | 3/1998 | Engebretson et al. |
| 6,463,128 | B1 | 10/2002 | Elwin |
| 6,820,053 | B1 | 11/2004 | Ruwisch |
| 6,944,474 | B2 | 9/2005 | Rader et al. |
| 7,016,507 | B1 | 3/2006 | Brennan |
| 8,010,366 | B1 | 8/2011 | Kearby et al. |
| 8,027,743 | B1 | 9/2011 | Johnston |
| 8,369,549 | B2 | 2/2013 | Bartkowiak et al. |
| 8,582,790 | B2 | 11/2013 | Knox et al. |
| 9,468,401 | B2 | 10/2016 | Van Hasselt et al. |
| 2003/0028385 | A1 | 2/2003 | Christodoulou |
| 2006/0282264 | A1 | 12/2006 | Denny et al. |
| 2007/0225984 | A1 | 9/2007 | Milstein et al. |
| 2008/0147392 | A1 | 6/2008 | Shaffer |
| 2009/0086933 | A1 | 4/2009 | Patel et al. |
| 2009/0097677 | A1 | 4/2009 | Shaffer |
| 2009/0185704 | A1 | 7/2009 | Hockley |
| 2010/0094619 | A1 | 4/2010 | Hubner et al. |
| 2011/0178799 | A1 | 7/2011 | Allen et al. |
| 2011/0282669 | A1 | 11/2011 | Michaelis |
| 2011/0300806 | A1 | 12/2011 | Lindahl |
| 2012/0215532 | A1 | 8/2012 | Foo et al. |
| 2013/0339025 | A1 | 12/2013 | Suhami |
| 2015/0269953 | A1 | 9/2015 | Siami |

FOREIGN PATENT DOCUMENTS

| | | |
|---|---|---|
| CN | 1604604 A | 4/2005 |
| CN | 1855704 A | 11/2006 |
| DE | 102006015497 A1 | 10/2007 |
| EP | 2178313 A2 | 4/2010 |
| EP | 2369859 A2 | 9/2011 |
| TW | 1279776 B | 4/2007 |
| WO | 00/27284 A1 | 5/2000 |
| WO | 03/026349 A1 | 3/2003 |
| WO | 2006/130909 A1 | 12/2006 |

OTHER PUBLICATIONS

International Search Report for PCT/US2012/065995 dated Sep. 26, 2013.

Written Opinion of the International Searching Authority for PCT/US2012/065995 dated Sep. 26, 2013.

* cited by examiner

Sample user voice to sample time domain, frequency domain, and identify dominants of vocals for user and determine a vocal range for the user.

↓

Determine voice metrics based on the sampled user voice and parameters identified during the sampling of the user's voice to

↓

Save the determined voice metrics of the user in a user voice database that is accessible for defining parameters for a user filter used to improve the audio characteristics of audio data received from the user

↓

Receive voice data from the user and cancel noise and otherwise enhance the voice data via the user filter to enhance the received voice data for transmitting that enhanced voice data

↓

Use a hearing profile of an intended recipient of the received voice data to improve the clarity and reduce noise of the received voice data

↓

Transmit the received voice data to the intended recipient

FIGURE 3

METHOD, DEVICE, AND SYSTEM FOR AUDIO DATA PROCESSING

CROSS-REFERENCE TO RELATED APPLICATIONS

This application is a continuation application of U.S. patent application Ser. No. 15/665,537, which is a continuation of U.S. patent application Ser. No. 14/372,233, which is the United States national phase under 35 U.S.C. § 371 of PCT International Patent Application No. PCT/US2012/065995, filed on Nov. 20, 2012.

FIELD OF INVENTION

The present invention relates to communication systems, such as communication systems that utilize cellular phones, mobile computer devices, tablets, laptops, or other terminal devices. More particularly, the present invention relates to a system, method and device configured to edit received audio data to improve voice quality voice data that is received for recording or transmission.

BACKGROUND OF THE INVENTION

Telecommunication endpoints are often equipped with a noise reduction device. Such a device is typically configured to filter voice data received by the device to deliver a better voice content when that data is output or transmitted as outputted audio data. However, filters used in such noise reduction mechanisms are typically general purpose filters designed to process audio in a generic manner. As a result, the noise reduction may fail to provide a great improvement in voice quality or other attributes to outputted audio data.

We have determined that a new method and apparatus are needed to improve audio characteristics of audio output that is output based upon received audio data. In some embodiments of our method and apparatus, audio that is outputted may be configured to utilize hearing and speaking parameters that are based on speaking and hearing profiles of the users' performing the speaking and performing the hearing.

SUMMARY OF THE INVENTION

A method of transmitting voice data is provided. An embodiment of the method may include the steps of a communication device prompting a user to speak to obtain a sample of a voice of the user to identify at least one of time domain, frequency domain, vocal dominants, and a vocal range of the voice of the user, the communication device determining voice metrics for the voice of the user based on the sample of the voice of the user, the communication device storing the voice metrics of the voice of the user, the communication device receiving voice data from the user, the communication device modifying the received voice data based on the at least one of the voice metrics, the time domain, the frequency domain, the vocal dominants, and the vocal range of the voice of the user, and the communication device transmitting the modified voice data to another device so that the modified voice data is outputtable to at least one recipient.

Some embodiments of the method may include additional steps or modifications. For instance, the method may also include the steps of the communication device generating tones for emitting to a user so the user hears the tones, the communication device receiving input that identify volume settings at which the tones are hearable to the user, and the communication device determining a hearing profile of the user based on the received input that identified the volume settings at which the tones are hearable to the user. Additionally, embodiments of the method may include the step of the communication device adjusting a volume of audio data that is received by the communication device to output the audio data at a louder volume based on the hearing profile of the user.

In one embodiment, the method may include the steps of the communication device transmitting the hearing profile of the user to another communication device and the other communication device modifying audio data based on the hearing profile of the user prior to transmitting that audio data to the communication device. In one embodiment, the other device may modify audio data prior to transmitting the audio data to the user by having a portion of the audio data that is within an audio spectrum that the hearing profile of the user indicates is unhearable to the user omitted from the audio data so that the transmitted audio data does not contain audio within the unhearable audio spectrum of the user. In other embodiments, the audio data may be modified by the other communication device by increasing the volume of the audio data so that all the transmitted voice data within the transmitted audio data is within a hearable audio spectrum of the user.

For certain embodiments, the voice metrics of the voice of the user is comprised of parameters that are based on the time domain for the voice, the frequency domain for the voice, the vocal dominants for the voice, and a vocal range of the voice of the user. The communication device may modify the voice data based on at least one of the voice metrics, the time domain, the frequency domain, the vocal dominants. The vocal range of the voice of the user can be comprised of the communication device removing a portion of the received voice data that is within a frequency range that is outside of the frequency domain of the voice of the user. The communication device modifying the voice data based on at least one of the voice metrics, the time domain, the frequency domain, the vocal dominants, and the vocal range of the voice of the user may also be comprised of the communication device applying a parameter that is based on at least one of the voice metrics, the time domain, the frequency domain, the vocal dominants, and the vocal range of the voice of the user of the user's voice to noise cancellation processing of the received voice data.

The communication device may be any of a number of types of devices. For instance, the communication device may be a server, a workstation, a desktop computer, a tablet, a mobile cellular phone, an internet appliance, a laptop computer, a smart phone, a personal digital assistant, a mobile computer device, or a communication terminal. In some embodiments, the communication device may also be configured to determine that received voice data is from the user.

Communication systems are also provided. Some embodiments of the communication system may include a communication system configured to utilize an embodiment of the above discussed methods, which are further discussed below.

A non-transitory computer readable medium is also provided. The non-transitory computer readable medium has an application stored thereon that defines a method that is performed by a communication device when the application is executed by the communication device. The method may include any of the above noted embodiments of a method, which are further discussed below. For instance, an embodiment of the method may include the steps of the communication device prompting a user to speak to obtain a sample of a voice of the user to identify at least one of time domain, frequency domain, vocal dominants, and a vocal range of the voice of the user, the communication device determining voice metrics for the voice, of the user based on the sample of the voice of the user, the communication device storing the voice metrics of the voice of the user and associating those saved voice metrics with the user, the communication device receiving voice data from the user, the communication device modifying the received voice data based on the at least one of the of the time domain, the frequency domain, the vocal dominants, and the vocal range of the voice of the user, and the communication device transmitting the modified voice data to another device.

Some embodiments of the method defined by the application of the computer readable medium may also include the steps of the communication device generating tones for emitting to a user so the user hears the tones, the communication device receiving input that identify volume settings at which the tones are hearable to the user, and the communication device determining a hearing profile of the user based on the received input that identified the volume settings at which the tones are bearable to the user. The communication device may also adjust a volume of audio data that is received by the communication device to output the audio data at a louder volume based on the hearing profile of the user. The communication device may transmit the hearing profile of the user to another communication device and the other communication device may modify the audio data based on the hearing profile of the user prior to transmitting that audio data to the communication device based on the hearing profile of the user. In one embodiment, the other device may modify audio data prior to transmitting the audio data to the user by having a portion of the audio data that is within an audio spectrum that the hearing profile of the user indicates is unhearable to the user omitted from the audio data so that the transmitted audio data does not contain audio within the unhearable audio spectrum of the user. In other embodiments, the audio data may be modified by the other communication device by increasing the volume of the audio data so that all the transmitted voice data within the transmitted audio data is within a bearable audio spectrum of the user.

In certain embodiments of the method defined by the application, the communication device modifying the voice data based on the at least one of the time domain, the frequency domain, the vocal dominants, and the vocal range of the voice of the user can include a number of steps. For instance, such a modification may be comprised of the communication device removing a portion of the received voice data that is within a frequency range that is outside of the frequency domain of the voice of the user and the communication device applying a parameter that is based on at least one of the time domain, the frequency domain, the vocal dominants, and the vocal range of the voice of the user of the user's voice to noise cancellation processing of the received voice data.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

FIG. 3 is a flow chart of an exemplary method for outputting voice data or audio data.

DETAILED DESCRIPTION OF PRESENT PREFERRED EMBODIMENTS

Referring to FIGS. 1-4, a communication device may be a computer device such as a server or workstation or a terminal device such as a desktop computer, a tablet, a mobile cellular phone, an internet appliance, a laptop computer, a smart phone, a personal digital assistant, a mobile computer device, or a communication terminal. In one embodiment of a system, a network 24 may include the first and second communication terminals 21, 22 that are communicatively connected via a communication path that is established and maintained via a computer device 25. The network 24 may be a wide area network or local area network such as an enterprise network in some embodiments of the system.

Figure 1:
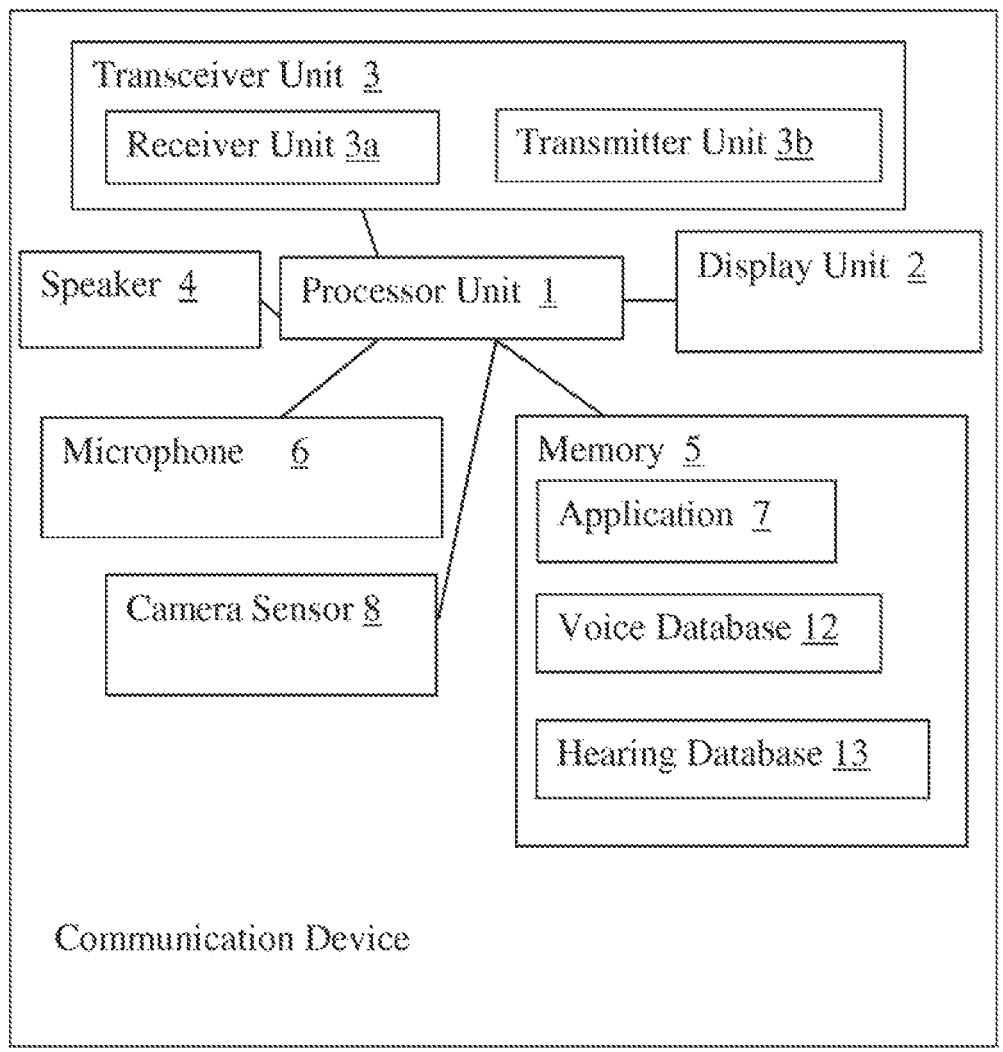
FIG. 1 is a block diagram of an exemplary embodiment of a communication device, which may be for example a server, a computer device, a workstation, a tablet, a laptop computer, a telephony device, an internet appliance, a personal digital assistant, a smart phone, a cellular phone, a telephone, or other type of communication terminal. It should be understood that more than one microphone and more than one speaker may be included within embodiments of the communication device (e.g. some embodiments of a communication device may include a one ear speaker and a loud speaker and may include two microphones, one for surrounding audio detection and one for surrounding noise cancellation).
Figure 2:
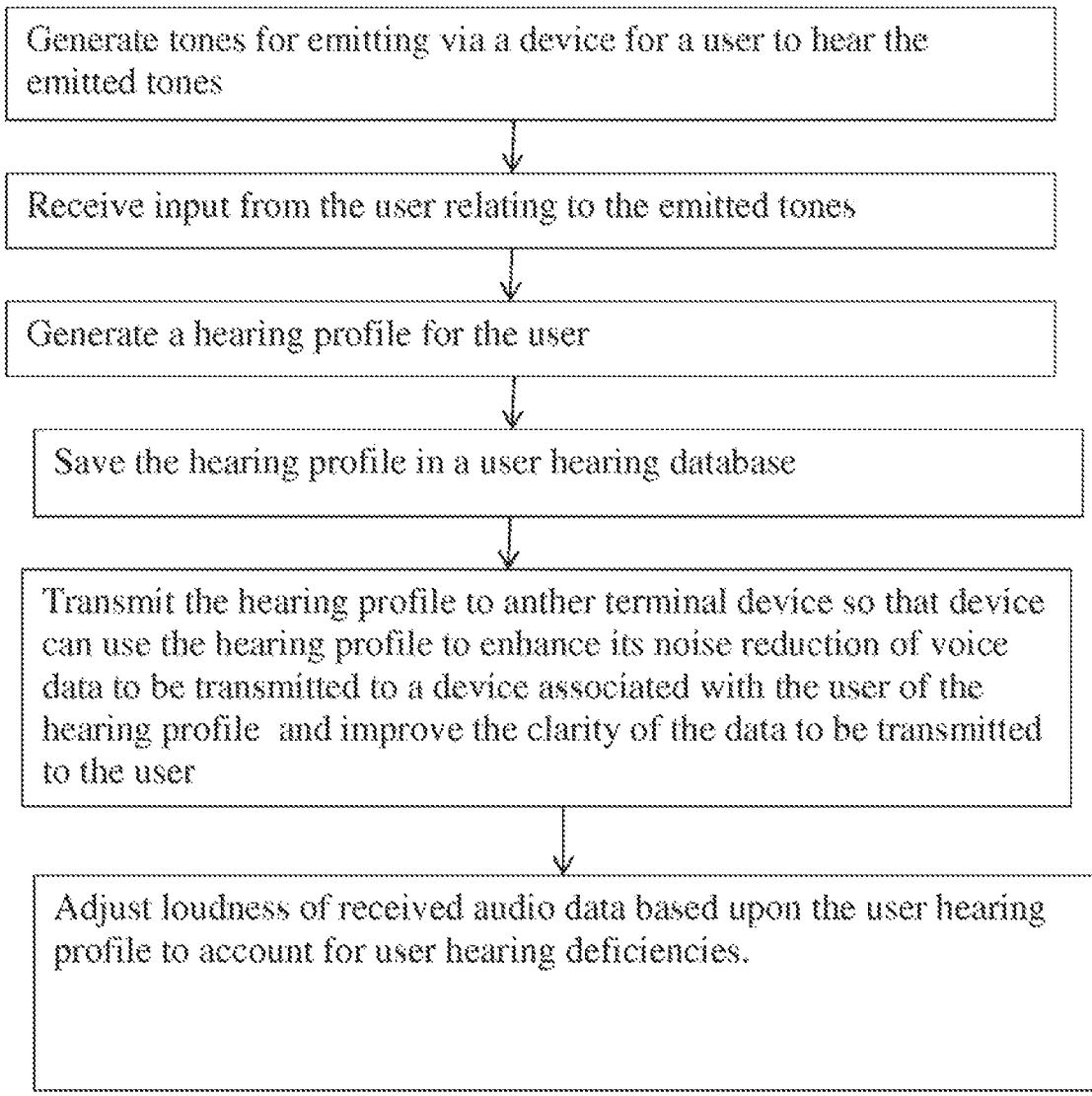
FIG. 2 is a flow chart of an exemplary method for transmitting voice data or audio data.
Figure 4:
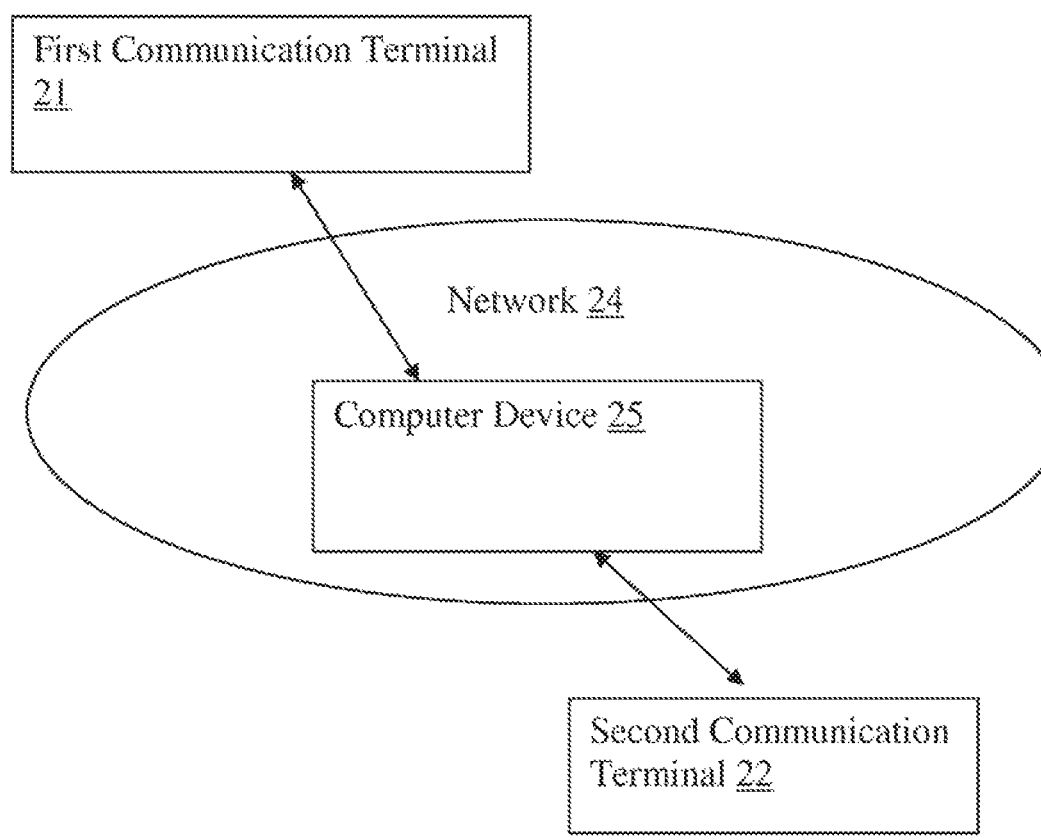
FIG. 4 is a block diagram of an exemplary embodiment of a communication system.

The first and second communication terminals 21 and 22 of the system shown in FIG. 4 may each be an embodiment of the communication device shown in FIG. 1. Alternatively, the computer device 25 shown in FIG. 4 may function as a telephony type communication device or media communication device such as a switch device, media server, or teleconference server that may be an embodiment of the communication device shown in FIG. 1.

The communication device may include a processor unit 1 that is communicatively connected to a transceiver unit 3 that includes a receiver unit 3*a* and a transmitter unit 3*b*, a display unit 2, at least one input device such as a microphone 6 and camera sensor 8, memory 5, and a speaker 4. The transceiver unit 3 may include a receiver unit 3*a* and a transmitter unit 3*b* for transmission and reception of data via a cellular network, a wireless network connection, or other network connection or may be configured to form a wireless connection via a near field communication, a Bluetooth compliant communication, or other type of wireless communication mechanism or permit a wired connection such as a wired connection made via a universal serial bus connection, for example. In some embodiments, the communication device may include additional transceiver units as well.

The processor unit 1 may be a central processing unit such as a microprocessor, interconnected microprocessors, or other hardware processor element. The memory 5 may be a non-transitory computer readable medium that has at least one application 7 stored thereon that defines a method that is performed by the communication device, such as for example the method shown in FIG. 2 or 3. The memory 5 may include a hard drive, a flash drive, an optical disk or a hard disk or other type of computer readable medium that can stores data for a non-transitory period of time. Datasets such as a voice database 12 and hearing database 13 as well as other data that may be utilized by the communication device when running the application 7 may also be stored in the memory 5.

The speaker 4 may include multiple speakers that emit audio and the microphone 6 may be an input device that records audio emitted by a user for receiving that audio data. For instance, the microphone 6 may include a first microphone that detects surrounding noise and a second microphone that is used for cancellation of surrounding noise and the speaker 4 may include a first speaker for emitting noise to one human ear and a second speaker that is a loud speaker. The display unit 2 may be a liquid crystal display or other display device. The display unit 2 may be configured as an input device and an output device such as touch screen display that functions to output data visually while also permitting a user to provide input by touching different portions of the display. Other types of input devices such as a button, keyboard, Bluetooth headset or Bluetooth ear-set, or a mouse, may also be connectable to the processor unit 1 so that a user may utilize that input device to provide input to the device.

The communication device may run an application 7 via processor unit 1. The application 7 may define a method that is executed by the communication device when the application is run. Examples of such a method may be appreciated from FIGS. 2 and 3. For example, the communication device may run the application to create a hearing profile for storing in a hearing database for use in transmitting or outputting received audio or may generate a voice profile for use in a voice database that may be used to enhance voice data received via microphone 6 prior to transmitting that voice data to modify the received voice data to improve the clarity, reduce the noise within the received voice data, or otherwise enhance the voice data so that the transmitted voice data has an enhanced quality.

For instance, the communication device may run the application and prompt a user to enter voice input via the microphone 6 so that voice data can be collected of the user's voice to define a user voice profile for saving in the voice database 12. The user's spoken voice may be recorded so that a voice profile that defines a specific filter for the user can be prepared and saved as the user voice profile in the voice database 12. Alternatively, the voice database 12 may save parameters for sending to a filter when the user is detected as the speaker so that any voice data recorded from that user is filtered by the filter in accordance with the voice parameters defined in the voice database 12 for that user.

The communication device may send output to the user via the display unit 2 to prompt the user to provide certain voice data at different volumes or at different speeds to obtain a sample of the user's voice. The sampling of the user's voice may utilize a sampling of the different vocals and frequencies of the user's voice. For instance, the prompting output to the user may ask a user to speak a certain phrase at different octaves (e.g. in a low voice or in a high voice) or at different speeds (e.g. slowly and quickly) to record that phrase when spoken by the user when meeting those conditions. The user may also be directed via audio to repeat a specific sentence in his or her preferred language that has significant phonemes for voice analysis. The recorded voice data is subsequently assessed to determine what frequencies a user's spoken voice may not contain and what frequencies are a strength of the user's voice (e.g. the frequency ranges at which the user's voice is most often present when the user speaks).

After the user's voice is assessed, the communication device may determine that a user's voice does not contain specific frequencies. The range of frequencies that are not present within the user's voice may therefore be cut out by a filter so that no sound within those frequencies is output or transmitted to another device when recording the user's voice for sending to another device such as what may be done when the communication device records a video via the camera sensor 8 and microphone 6 or when the user is engaged in a phone call using the communication device. The removal of this frequency range that does not include the user's voice can eliminate noise that may be present during a recording of the user's voice and may reduce the processing needed for performing noise reduction or other voice data cleanup that may be performed on the recorded voice data prior to saving that voice data or transmitting that voice data.

Additionally, the frequency ranges that is a strong range for the user's voice (e.g. a range in which the user's voice is almost always present) may be determined from the sampling of the user' voice. The filtration of the use's voice in the frequency range that is determined to be a strength for the user's voice may be identified so that such spectrums may be filtered with a finer granularity.

In one embodiment, a voice profile for a user may be defined and ranged by an assessment of a recorded voice sample that is recorded upon a user speaking words and phrases that he or she is prompted to say via the display unit 2. The time domain, frequency domain, and dominants of the user's vocals may then be assessed by the communication device analyzing the recorded voice sample. The assessed parameters of the user's voice may then be saved in a voice database 12 for defining the filtering of the user's voice for purposes of enhancing any voice data received from the user that is for saving in association with a video recording or transmitting via a voice channel, media transmission, phone call, or other voice data transmission. It should be understood that the enhancement of the voice data to be transmitted may occur in parallel with noise cancellation that may be performed by the communication device. The noise cancellation and voice enhancement may occur prior to the packetizing of the voice data that is modified via the noise cancellation and voice enhancement. The packetized modified voice data may then be transmitted to another device.

The communication device may also prompt a user to provide input to the communication device in response to emitted audio that is output via at least one speaker 4 so that a hearing profile for the user may be determined and stored in a hearing database 13. The hearing database 13 may then be used in processing received audio data and may also be utilized in processing voice data to be output or transmitted to another device. For instance, a particular user may have a frequency spectrum that the user is less sensible to or unable to hear any audio when that audio falls within that frequency spectrum. Such a spectrum may be identified in the hearing profile of the user and subsequently utilized to modify the voice data to be output to that user or to be transmitted to a device associated with that user such as a user's telephone or cellular phone.

For example, the communication device may prompt the user to respond to a series of tones emitted at different levels of loudness via speaker 4. The input provided by the user may indicate at what volume or loudness level the user is able to hear different emitted tones and may prompt the user to detect the same series of tones emitted at different levels of loudness for each ear individually via a one ear speaker and also for both ears together via a loud speaker. The input provided by the user may then be utilized by the communication device to determine the hearing thresholds for each ear of the user as well as for both ears of the user. The hearing profile of the user may then be linked with the user and utilized in a number of ways. Additionally, the formed hearing profile may also be sent to other devices that may send audio data to the communication device or other device associated with the user so that the user's hearing profile may be utilized to modify the voice data to be sent to the user to enhance the clarity of that data to that user.

For example, the hearing profile may be stored in the memory 5 of the communication device by being within a hearing database 13. The communication device may then adjust the loudness of received voice data so that voice data or other audio data that is not within a frequency to which the user may hear is modified so that the voice data that is output is hearable by the user. The hearing profile may be applied to a real-time transport protocol ("RTP") decoder or other audio equalizer through the audio path to provide such an adjustment, for example. The hearing profile within the user's own communication device may therefore adjust the volume setting at which received data is to be emitted so that it improves the clarity of that data to the user.

As another example, the hearing profile may be gent to another communication device so that audio data that is transmitted to the user's communication device may be modified by the device transmitting that data to the user to account for the user's specific hearing capabilities via the user's hearing profile. For instance, the transmitting communication device that receives the user's hearing profile may enhance its noise reduction to voice data to be transmitted to the communication device associated with the user based on the user's hearing profile. The voice data to be transmitted may be modified so that the voice data is within the spectrum of the user's hearing profile to improve the clarity of the transmitted data to the user. The transmitting device may also, or alternatively, modify the audio data to be transmitted to the user's communication device to avoid, omit, or otherwise nullify audio within the spectrum where the user has no sensibility at all or is near deaf within that spectrum so that bandwidth and processing power associated with the transmission and receipt of that portion of the audio data may be saved.

The communication device of the user may send the user's hearing profile or hearing database 13 of the communication device to a transmitting device so that it can be saved by that other device for future calls or other transmissions of audio data. The other device may associate the user's hearing profile with an address of the user's communication device such as a phone number or internet protocol address of that device so that any communication utilizing that address may result in the use of the user's hearing profile to modify voice data or other audio data to be transmitted to that user's communication device. The transmitting device may save that profile for use in future communication sessions as well based upon an association of a device address such as a phone number associated with the user and a call being established with a device having that address. The hearing profile of the user may also be associated with other devices to which the user is associated such as a voice mailbox or email address so that audio data transmitted to these other devices or addresses are modified to improve the clarity of the audio data to the user to which the information is addressed.

In some embodiments of the communication device, the user may enter input during a call or other communication session to actuate a sending of a message to another device engaged in that communication session. That input that is entered may indicate to a call partner that the user does not want a hearing profile associated with that user to be applied during a particular session or during any future call or future communication session. Such input may actuate a message to deactivate use of a hearing profile by another device to be sent to this device during an ongoing call or other communication session or may be transmitted. Such a message may alternatively be sent after or before a particular communication session. Such a message may be sent upon a user creating a new hearing profile or voice profile for example. Such a message may be sent along with a replacement hearing profile or voice profile for saving by the other device for use in subsequent communication sessions.

It should be understood that the modification of voice data or other audio data to improve the clarity of that data to a particular user when that data is output to the user may result in skewing the audio data to place that data in a part of a spectrum that is more sensible to that user. Such a skewing may result in the speaker's voice characteristic being changed. But, this may also result in improving the clarity of the communication to the user so that more data is actually heard by the user and understood by the user during a communication session such as a telephone call or conference call.

It should be appreciated that a first communication terminal 21 and second communication terminal 22 may each have a voice database and hearing database for use during a telephone call between the two devices. Each communication terminal may modify voice data of the user speaking into a microphone of that terminal so that the transmitted voice data is modified to improve its clarity to the user of the receiving terminal. In one contemplated alternative embodiment, a switch device such as a computer device 25 that is within the transmission path of the two terminals during the communication session may have the hearing and voice databases and modify the audio data to be transmitted to a particular user based upon the hearing profile of the user to receive an output of the audio data and the voice profile of the speaker that is transmitting that audio data to the receiving party.

In some embodiments of the communication device, more than one user may utilize that device. Different users may create different hearing profiles and different voice profiles. For instance, each use may utilize the communication device to have a hearing profile and voice profile created, saved and transmitted as discussed above. The formed profiles of the users may be saved in the memory of the same device and be linked with a user identification to distinguish the different users. Each user may then identify themselves in any of a number of ways. For instance, each use may enter a unique log-on identification or code that identifies that user as the one that is currently using the device. The log-on identification may include entering a personal identification number or pressing certain portions of a touch screen display of the communication device in a predefined sequence of touches to enter the user's reference number or identification code. Upon detection of such an entered user identification, the communication device may then utilize the profiles within the voice and hearing databases for the identified user. As another option, a user may select a specific profile for user by entering input via an input device to select the user specific profiles. In some embodiments, a communication device may by default associate a user's hearing and voice profiles with the user identified via an entered identification. A user may then provide input to deactivate such a setting or alter the settings.

While certain present preferred embodiments of the communication device, communication system, and methods of making and using the same have been shown and described above, it is to be distinctly understood that the invention is not limited thereto but may be otherwise variously embodied and practiced within the scope of the following claims.

What is claimed is:

1. A method of transmitting voice data comprising:
   a communication device prompting a user to speak to obtain a sample of a voice of the user to identify at least one of a time domain of the voice of the user, a frequency domain of the voice of the user, vocal dominants of the voice of the user, or a vocal range of the voice of the user, the communication device comprising a processor connected to a non-transitory computer readable medium;
   the communication device determining voice metrics for the voice of the user based on the sample, the voice metrics comprising information identifying frequencies that are not within the voice of the user and the vocal dominants of the voice of the user;
   the communication device storing the voice metrics of the voice of the user;
   the communication device receiving voice data from the user;
   the communication device modifying the received voice data based on the voice metrics to enhance the received voice data in a frequency range that is a strength for the voice of the user, wherein the strength for the voice of the user comprises a frequency range in which the voice of the user is most often present within the sample of the voice of the user; and
   the communication device transmitting the modified voice data to another device so that the modified voice data is outputtable to at least one recipient;
   the communication device generating tones for emitting to the user;
   the communication device receiving input that identify volume settings at which the tones are hearable to the user;
   the communication device determining a hearing profile of the user based on the received input; and
   the communication device transmitting the hearing profile of the user to another communication device for modification of audio data of another user based on the hearing profile of the user.

2. The method of claim 1 further comprising:
   the communication device adjusting a volume of audio data that is received by the communication device to output the audio data at a louder volume based on the hearing profile of the user.

3. The method of claim 1 further comprising:
   the other communication device modifying the audio data based on the hearing profile of the user prior to transmitting that audio data to the communication device.

4. The method of claim 3, wherein the other communication device modifying the audio data based on the hearing profile of the user prior to transmitting that audio data to the communication device comprises:
   omitting a portion of the audio data that is within an audio spectrum identified as being unhearable to a user via the hearing profile of the user so that the transmitted audio data does not include that portion of the audio data.

5. The method of claim 1 wherein the communication device modifying the received voice data based on the voice metrics is comprised of the communication device removing a portion of the received voice data that is within a frequency range that is outside of the frequency domain of the voice of the user.

6. The method of claim 4 wherein the communication device modifying the received voice data based on the voice metrics occurs such that the voice data is modified based on the time domain, the frequency domain, the vocal dominants, and the vocal range of the voice of the user so that the range of the frequencies that are not within the voice of the user are cut out of the received voice data to form the modified voice data so that the modified voice data does not contain the data for the noise within the frequencies that are not within the voice of the user.

7. The method of claim 1 wherein the communication device is one of a server, a workstation, a desktop computer, a tablet, a mobile cellular phone, an internet appliance, a laptop computer, a smart phone, a personal digital assistant, a mobile computer device, or a communication terminal.

8. The method of claim 7, comprising:
   the communication device outputting audio via a speaker of the communication device based on the modified audio data received from the other communication device.

9. A non-transitory computer readable medium having an application stored thereon that defines a method that is performed by a communication device when the application is executed by the communication device, the method comprising:
   a communication device prompting a user to speak to obtain a sample of a voice of the user to identify at least one of a time domain, a frequency domain, vocal dominants, or a vocal range of the voice of the user;
   the communication device determining voice metrics for the voice of the user based on the sample, the voice metrics comprising information identifying frequencies that are not within the voice of the user;
   the communication device storing the voice metrics of the voice of the user;
   the communication device receiving voice data from the user;
   the communication device modifying the received voice data based on the voice metrics to enhance the received voice data in a frequency range that is a strength for the voice of the user, wherein the strength for the voice of the user comprises a frequency range in which the voice of the user is most often present within the sample of the voice of the user; and
   the communication device transmitting the modified voice data to another device so that the modified voice data is outputtable to at least one recipient;
   the communication device generating tones for emitting to the user;
   the communication device receiving input that identify volume settings at which the tones are hearable to the user;
   the communication device determining a hearing profile of the user based on the received input that identified the volume settings at which the tones are hearable to the user.

10. The computer readable medium of claim 9 wherein the method further comprising:

the communication device adjusting a volume of audio data that is received by the communication device to output the audio data at a louder volume based on the hearing profile of the user.

11. The computer readable medium of claim 9 wherein the communication device is a first communication device and the method further comprising:
   the first communication device transmitting the hearing profile of the user to a second communication device such that the second communication device modifies audio data based on the hearing profile of the user prior to transmitting that modified audio data to the first communication device such that the modified audio data that is transmitted to the first communication device omits any portion of the audio data that is within a first audio spectrum, the first audio spectrum being an audio spectrum identified by the hearing profile of the user as being unhearable audio to the user.

12. The computer readable medium of claim 9 wherein the communication device modifying the voice data based on the voice metrics comprises modifying the voice data based on the time domain, the frequency domain, the vocal dominants, and the vocal range of the voice of the user so that the range of the frequencies that are not within the voice of the user are cut out of the received voice data to form the modified voice data so that the modified voice data does not contain a portion of the received voice data that is within a frequency range that is outside of the frequency domain of the voice of the user.

13. The computer readable medium of claim 9 wherein the communication device modifying the voice data based on the voice metrics comprises the communication device filtering the received voice data for enhancing the received voice data in a frequency range that is determined to be the strength for the voice of the user to form the modified voice data via removing a portion of the received voice data that is within a frequency range that is outside of the frequency domain of the voice of the user.

14. A communication apparatus comprising:
   a communication device configured to prompt a user to speak to obtain a sample of a voice of the user to identify at least one of a time domain, a frequency domain, vocal dominants, and a vocal range of the voice of the user, the communication device comprising hardware;
   the communication device configured to determine voice metrics for the voice of the user based on the sample, the voice metrics comprising information identifying frequencies that are not within the voice of the user and the vocal dominants of the voice of the user;
   the communication device configured to store the voice metrics of the voice of the user in a non-transitory computer readable medium;
   the communication device configured to receive voice data from the user;
   the communication device configured to modify the received voice data based on the voice metrics, the time domain, the frequency domain, the vocal dominants, and/or the vocal range of the voice of the user so that a range of the frequencies that are not within the voice of the user are cut out of the received voice data to form modified voice data so that the modified voice data does not contain data for noise within the frequencies that are not within the voice of the user and also modify the received voice data to enhance the voice data in a frequency range that is a strength of the voice of the user, the strength for the voice of the user comprising a frequency range in which the voice of the user is most often always present within the sample of the voice of the user; and
   the communication device configured to transmit the modified voice data so that the modified voice data is outputtable to at least one recipient;
   the communication device configured to generate tones for emitting to a user;
   the communication device configured to receive input that identify volume settings at which the tones are hearable to the user;
   the communication device configured to determine a hearing profile of the user based on the received input;
   the communication device configured to transmit the hearing profile of the user to another communication device such that the other communication device modifies audio data of another user based on the hearing profile of the user.

15. The communication apparatus of claim 14 wherein the hardware comprises a processor and a transceiver unit, and wherein at least one of a display device, a microphone, and a camera sensor is connected to the communication device.

16. The communication apparatus of claim 14 wherein the hardware comprises a processor, a transceiver unit, a display device, a microphone, and a camera sensor.

17. The communication apparatus of claim 14 comprising:
   a first communication terminal and a second communication terminal, the communication device being communicatively connected to the first communication terminal and the second communication terminal such that the modified voice data is transmittable to at least one of the first communication terminal and the second communication terminal for output of the modified voice data; and
   wherein the communication device is configured to modify the voice data based on the time domain, the frequency domain, the vocal dominants, and/or the vocal range of the voice of the user so that a range of the frequencies that are not within the voice of the user are cut out of the received voice data to form modified voice data so that the modified voice data does not contain the data for the noise within the frequencies that are not within the voice of the user and also filter the received voice data for enhancing the received voice data in a frequency range that is determined to be the strength for the voice of the user to form the modified voice data.

18. The communication apparatus of claim 17 wherein the user is a user of the first communication terminal and the recipient is a user of the second communication terminal.

19. The communication system of claim 18 wherein the communication device is configured to transmit the modified voice data to the second communication terminal so that the modified voice data is outputtable to the recipient via the second communication terminal.

* * * * *